(12) United States Patent
Wang et al.

(10) Patent No.: US 7,860,124 B2
(45) Date of Patent: Dec. 28, 2010

(54) METHOD AND SYSTEM FOR BANDWIDTH CONTROL, APPARATUS FOR ACCESS CONTROL AND APPARATUS FOR USER PROFILE MANAGEMENT

(75) Inventors: Fangshan Wang, Shenzhen (CN); Jieping Zhong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 90 days.

(21) Appl. No.: 12/137,893

(22) Filed: Jun. 12, 2008

(65) Prior Publication Data

US 2008/0273553 A1 Nov. 6, 2008

Related U.S. Application Data

(63) Continuation of application No. PCT/CN2006/003113, filed on Nov. 20, 2006.

(30) Foreign Application Priority Data

Feb. 23, 2006 (CN) .................. 2006 1 0008043

(51) Int. Cl.
*H04L 12/28* (2006.01)
*H04J 3/16* (2006.01)
(52) U.S. Cl. .................. 370/468; 370/395.43
(58) Field of Classification Search .......... 370/468, 370/395.21, 395.4, 395.2, 395.43, 426, 401, 370/328, 338, 352, 252, 254
See application file for complete search history.

(56) References Cited

U.S. PATENT DOCUMENTS

| | | | |
|---|---|---|---|
| 6,046,981 A * | 4/2000 | Ramamurthy et al. ....... | 370/232 |
| 6,931,011 B2 * | 8/2005 | Giacopelli et al. ..... | 370/395.21 |
| 7,151,781 B2 * | 12/2006 | MeLampy et al. .......... | 370/468 |
| 7,209,458 B2 * | 4/2007 | Ahvonen et al. ............ | 370/328 |
| 7,606,146 B1 * | 10/2009 | Pan et al. .................... | 370/229 |
| 2004/0017795 A1 | 1/2004 | Abraham et al. | |
| 2004/0179476 A1 | 9/2004 | Kim et al. | |
| 2004/0260811 A1 * | 12/2004 | Cherkasova ................ | 709/225 |
| 2005/0086062 A1 | 4/2005 | Clark et al. | |

FOREIGN PATENT DOCUMENTS

| | | |
|---|---|---|
| CN | 1288632 A | 3/2001 |
| CN | 1518279 | 8/2004 |
| CN | 1535521 A | 10/2004 |
| CN | 1620036 | 5/2005 |
| EP | 1292054 A2 | 3/2003 |

(Continued)

OTHER PUBLICATIONS

European Search Report for European Patent Application No. 06817851.6, dated Nov. 14, 2008.

(Continued)

*Primary Examiner*—Hanh Nguyen

(57) ABSTRACT

A bandwidth control method includes: determining a service type of a service ordered by a user, allocating maximum usable bandwidth to the service type and setting up a bandwidth control policy for the service type; calculating bandwidth occupied by the service type when the user uses the service; and adjusting, according to the bandwidth control policy, the bandwidth occupied by the service type if the bandwidth occupied by the service type is higher than the maximum usable bandwidth allocated to the service type.

9 Claims, 7 Drawing Sheets

FOREIGN PATENT DOCUMENTS

| | | |
|---|---|---|
| GB | 2384646 | 7/2003 |
| WO | 02/052869 A2 | 7/2002 |
| WO | 2005/048533 A1 | 5/2005 |

OTHER PUBLICATIONS

Russian Office Action for Russian Patent Application No. 2008127283, dated Oct. 14, 2009, and English translation thereof.

European Office Action for European Patent Application No. 06817851.6, dated Nov. 27, 2009.

Chinese Office Action for Chinese Patent Application No. 200610008043X, dated Oct. 25, 2007, and English translation thereof.

International Search Report for International Application No. PCT/CN2006/003113, dated Mar. 8, 2007, and English Translation thereof.

* cited by examiner

METHOD AND SYSTEM FOR BANDWIDTH CONTROL, APPARATUS FOR ACCESS CONTROL AND APPARATUS FOR USER PROFILE MANAGEMENT

CROSS-REFERENCE TO RELATED APPLICATIONS

This application is a continuation of International Application No. PCT/CN2006/003113, filed Nov. 20, 2006. This application claims the benefit of Chinese Application No. 200610008043.X, filed Feb. 23, 2006. The disclosures of the above applications are incorporated herein by reference.

FIELD

The present disclosure relates to broadband access technology, and to a method and a system for bandwidth control, a communication system, an apparatus for service access control, an apparatus for terminal access control and an apparatus for user profile management.

BACKGROUND

The statements in this section merely provide background information related to the present disclosure and may not constitute prior art.

Broadband communication networks are provided by network operators for communications between user terminals or between a user terminal and a service provider. In a conventional broadband communication network, a user has to request and order bandwidth and an access method from a network operator in advance through a network administrator. While intending to access the network, the user needs to send a request for accessing the network in the access method ordered in advance. The access method includes Asymmetrical Digital Subscription Line (ADSL), optical fiber access, General Package Radio Service (GPRS), etc. Having accepted the request from the user, the network operator configures the network to allocate the bandwidth ordered by the user to the user and the bandwidth is the maximum bandwidth which the user may occupy while accessing the network, i.e., the maximum usable bandwidth. When the user is connected to the network, the network usually no longer controls the bandwidth allocated to the user and the bandwidth always remains unchanged unless the user requests to access the network again or to change the access method.

In a communication network, in order to improve the network resource utilization ratio and Quality of Service, a network access device, such as a multi-service bandwidth access server providing access, authentication and charging functions for users, usually controls the traffic entering the communication network. Therefore, in practical applications, the bandwidth allocated to a user usually changes with the network conditions and the distance from the user to the access server. Generally the bandwidth of a local Metropolitan Area Network (MAN) is broad and able to support higher local access traffic while the bandwidth from the MAN to the interface of the Internet is usually narrower than the bandwidth of the local MAN. The traffic expresses the maximum traffic in unit time, i.e., bandwidth, therefore the traffic control in unit time means bandwidth control. Hence, it can be seen that if the user bandwidth is not controlled, conflict may occur during bandwidth allocation or the bandwidth resources allocated to the user can not be sufficiently utilized.

Further, the user needs different bandwidth for different services. For example, when the user enjoys an online streaming media service, the bandwidth needed will be broader than the bandwidth needed for browsing a normal web page. Furthermore, different services have different requirements in realtime performance, e.g., online streaming media requires a high realtime performance and is sensitive to a delay, while some services including a download service require a moderate realtime performance and broad bandwidth. Obviously the user wishes that different bandwidth may be allocated for different services with different bandwidth demands. If the network does not control the bandwidth occupied by different services, the quality of some services may drop sharply and a proper network resource utilization ratio will be hard to achieve.

The existing network access devices usually control the bandwidth in two ways. In the first way, the bandwidth is controlled based on users, i.e., different bandwidth limits are allocated to users having different bandwidth authorities; in the second way, the bandwidth is controlled based on the combination of a data origination address and a data destination address. Both the two ways control the overall bandwidth only based on users or based on an access method and/or an address instead of the bandwidth for different service types or different services of a user or an access method and/or an address. Therefore although the two ways for controlling bandwidth have satisfied the basic requirements of different services, they cannot achieve actual effective bandwidth control or effectively improve the network resource utilization ratio. For example, when a mobile terminal user accesses the network with a bandwidth of 24 KB through the GPRS, the bandwidth of 24 KB shall be shared by all services of the user over the GPRS, and there is no way to control the bandwidth allocated to a specified service.

To sum up, the bandwidth control mechanism in the conventional broadband communication network is still far from satisfactory and cannot control bandwidth in accordance with the features of different services over the communication network, therefore the Quality of Service may not be guaranteed and the network resource utilization ratio is kept low in the conventional broadband communication network.

SUMMARY

The present disclosure provides a method and a system for bandwidth control, a communication system, an apparatus for service access control, an apparatus for terminal access control and an apparatus for user profile management, which are able to control bandwidth based on different service types so that the bandwidth resource utilization ratio and the quality of service over the network may be improved.

The present disclosure discloses a method for bandwidth control, including:

determining a service type of a service ordered by a user, allocating maximum usable bandwidth to the service type and setting up a bandwidth control policy for the service type;

calculating bandwidth occupied by the service type when the user uses the service; and adjusting, according to the bandwidth control policy, the bandwidth occupied by the service type if the bandwidth occupied by the service type is higher than the maximum usable bandwidth allocated to the service type.

The calculating bandwidth occupied by the service type when the user uses the service includes:

receiving data traffic of user terminals on a terminal access side, parsing data packets in the data traffic, determining users and service types of the data packets; calculating the bandwidth occupied by the service type by calculating data packets corresponding to the service type.

The calculating bandwidth occupied by the service type includes:

receiving data traffic of Application Servers (ASs) on a service access side, parsing data packets in the data traffic, determining users and service types of the data packets, and counting data packets corresponding to the service type in data traffic of each of the ASs; calculating the number of data packets corresponding to the service type in the data traffic of the ASs by adding up the data packets corresponding to the service type in data traffic of each of the ASs, and calculating the bandwidth occupied by the service type according to the number of data packets corresponding to the service type.

The present disclosure discloses a system for bandwidth control, including:

a calculation unit, capable of calculating bandwidth occupied by each service type through analyzing data traffic;

an information unit, capable of recording services ordered by users and the service type of each service and a bandwidth control policy and maximum usable bandwidth for each service type; and a control unit, capable of determining a service type which occupies bandwidth higher than maximum usable bandwidth of the service type according to the bandwidth occupied by the service type from the calculation unit and the maximum usable bandwidth of the service type from the information unit, querying the information unit for a bandwidth control policy of the service type, and adjusting the bandwidth occupied by the service type according to the bandwidth control policy.

The calculation unit includes:

an examination module, capable of parsing data packets in data traffic, determining a user, service and service type of each data packet and obtaining data packet information indicating the user, service and service type of each data packet, and a calculation module, capable of calculating the bandwidth occupied by each service type according to the data packet information from the examination module.

The information unit includes:

a service order module, capable of receiving service order information from the users, determining the services ordered by the users and the service type of each service, determining the maximum usable bandwidth and the bandwidth control policy for each service type; and an information record module, capable of recording the maximum usable bandwidth and the bandwidth control policy determined by the service order module for each service type.

The information record module includes:

a user service information module, capable of recording the maximum usable bandwidth determined by the service order module for each service type; and a bandwidth control policy information module, capable of recording the bandwidth control policy determined by the service order module for each service type.

The system includes at least one calculation units, and further includes:

a sum calculation unit, capable of calculating a sum of bandwidth occupied by the service type for different users according to the bandwidth occupied by the service types for different users from each calculation unit, and exporting the sum to the control unit.

The present disclosure also discloses a communication system, including:

at least one user terminal, at least one terminal access control apparatus for accessing data traffic of the user terminal, at least one Application Server (AS) and at least one service access control apparatus for accessing data traffic of the AS; the communication system further comprising:

a bandwidth control system, capable of determining the service type of a service ordered by a user, allocating maximum usable bandwidth to the service type and setting up a bandwidth control policy for the service type; for parsing data traffic from the service access control apparatus or the terminal access control apparatus, calculating bandwidth occupied by the service type for different users and adjusting the bandwidth occupied by a service type if the service type occupies bandwidth higher than the maximum usable bandwidth allocated to the service type.

The present disclosure also discloses a communication system, including:

at least one user terminal and at least one terminal access control apparatus for receiving data traffic of the user terminal, wherein the terminal access control apparatus is capable of determining the service type of a service ordered by a user connected to the terminal access control apparatus, allocating maximum usable bandwidth to the service type, setting up a bandwidth control policy for the service type, parsing data traffic from different user terminals, determining a user terminal and service type of each data packet; calculating bandwidth occupied by each service type for the at least one user terminal by calculating the total of data packets corresponding to the service type for the at least one user terminals, and adjusting bandwidth occupied by a service type if the service type occupies bandwidth higher than the maximum usable bandwidth allocated to the service type.

The present disclosure also discloses a communication system, including:

at least one Application Server (AS), and at least one service access control apparatus for accessing data traffic of the ASs, wherein the service access control apparatus is capable of determining the service type of each service provided by the at least one AS connected to the service access control apparatus, allocating maximum usable bandwidth to the service type of each service, setting up a bandwidth control policy for the service type, parsing data traffic from the at least one AS, determining a user terminal and service type of each data packet, counting data packets in the service type from each AS to different user terminals, calculating bandwidth occupied by the service type for different user terminals by calculating the total number of data packets in the service type from different ASs to different user terminals, and adjusting the bandwidth occupied by a service type if the service type occupies bandwidth higher than the maximum usable bandwidth allocated to the service type.

The present disclosure also discloses a terminal access control apparatus, connected to at least one user terminal, including:

a calculation unit, capable of parsing data traffic sent to different user terminals and calculating bandwidth occupied by each service type for different user terminals; and a control unit, capable of determining services ordered by the users, the service type of each service, a bandwidth control policy for the service type and the maximum usable bandwidth of the service type, determining a service type that occupies bandwidth higher than the maximum usable bandwidth of the service type according to bandwidth occupied by the service type for different user terminals from the calculation unit and the determined maximum usable bandwidth of the service type for different user terminals, determining the bandwidth control policy of the service type, and adjusting the bandwidth occupied by the service type according to the bandwidth control policy.

The present disclosure also discloses a service access control apparatus, connected to at least one Application Server (AS), including:

a calculation unit, capable of parsing data packets in data traffic from different ASs, determining a user terminal and service type of each data packet, counting data packets in each service type for different user terminals from each AS, summing the data packets in each service type for different user terminals from ASs to obtain the number of data packets in each service type for different user terminals, and calculating bandwidth occupied by each service type for different user terminals; and a control unit, capable of determining the service type of each service provided by different ASs, a bandwidth control policy for the service type and the maximum usable bandwidth of the service type, determining a service type that occupies bandwidth higher than the maximum usable bandwidth of the service type and corresponding bandwidth control policy according to the bandwidth occupied by the service type for different user terminals and the determined maximum usable bandwidth of the service type for different user terminals from the calculation unit, and adjusting the bandwidth occupied by the service type according to corresponding bandwidth control policy.

The present disclosure also discloses a user profile management apparatus, including:

a service order module, capable of receiving service order information from user terminals, determining the services ordered by the users and the service types thereof, determining the maximum usable bandwidths and bandwidth control policy for the service types of the services ordered by the users; and an information record module, capable of recording the maximum usable bandwidth and bandwidth control policy determined by the service order module for the service type of each service ordered by the users.

Therefore the method and the system for bandwidth control, the communication system, the apparatus for service access control, the apparatus for terminal access control and the apparatus for user profile management provided by the present disclosure are able to control the service bandwidth of a user according to service types, hence the service bandwidth of the user may be effectively utilized and the requirements of different service types may be satisfied. The present disclosure may properly control the bandwidth resources of the network and improves the overall Quality of Service, and provide a basis for the extension of various service applications. Hence the present disclosure is of considerable commercial value.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Reference throughout this specification to "one embodiment", "an embodiment", "specific embodiment", or the like in the singular or plural means that one or more particular features, structures, or characteristics described in connection with the embodiment is included in at least one embodiment of the present disclosure. Thus, the appearances of the phrases "in one embodiment" or "in an embodiment", "specific embodiment", or the like in the singular or plural in various places throughout this specification are not necessarily all referring to the same embodiment. Furthermore, the particular features, structures, or characteristics may be combined in any suitable manner in one or more embodiments.

This disclosure will be hereinafter described in detail with reference to accompanying drawings and various embodiments.

The present disclosure provides a bandwidth control method, which includes: allocating a maximum usable bandwidth to the service type of a service ordered by a user and setting a bandwidth control policy for the service type, monitoring whether the bandwidth occupied by one of service types enjoyed by the user is more than the maximum usable bandwidth corresponding to the one of service types, and if one of the service types occupies excessive bandwidth, adjusting the bandwidth of the service type according to the bandwidth control policy set up for the service type. The excessive bandwidth indicates the occupied bandwidth by a service type is higher than the maximum usable bandwidth allocated to the service type. The maximum usable bandwidth herein indicates a usable bandwidth threshold assigned to a user, and the maximum usable bandwidth is usually the bandwidth ordered by the user, not the bandwidth actually used by the user. The bandwidth actually used by the user is usually lower than the maximum usable bandwidth of the user.

The present disclosure also provides a bandwidth control system based on the basic theory of the bandwidth control method. The system is used for monitoring the bandwidth occupied by each service type enjoyed by the user, saving the bandwidth control policy and the maximum usable bandwidth of each service type, and adjusting, according to a corresponding bandwidth control policy, the bandwidth of a service which occupies excessive bandwidth. The bandwidth control system mainly includes a calculation unit, a control unit and an information unit.

Figure 1:
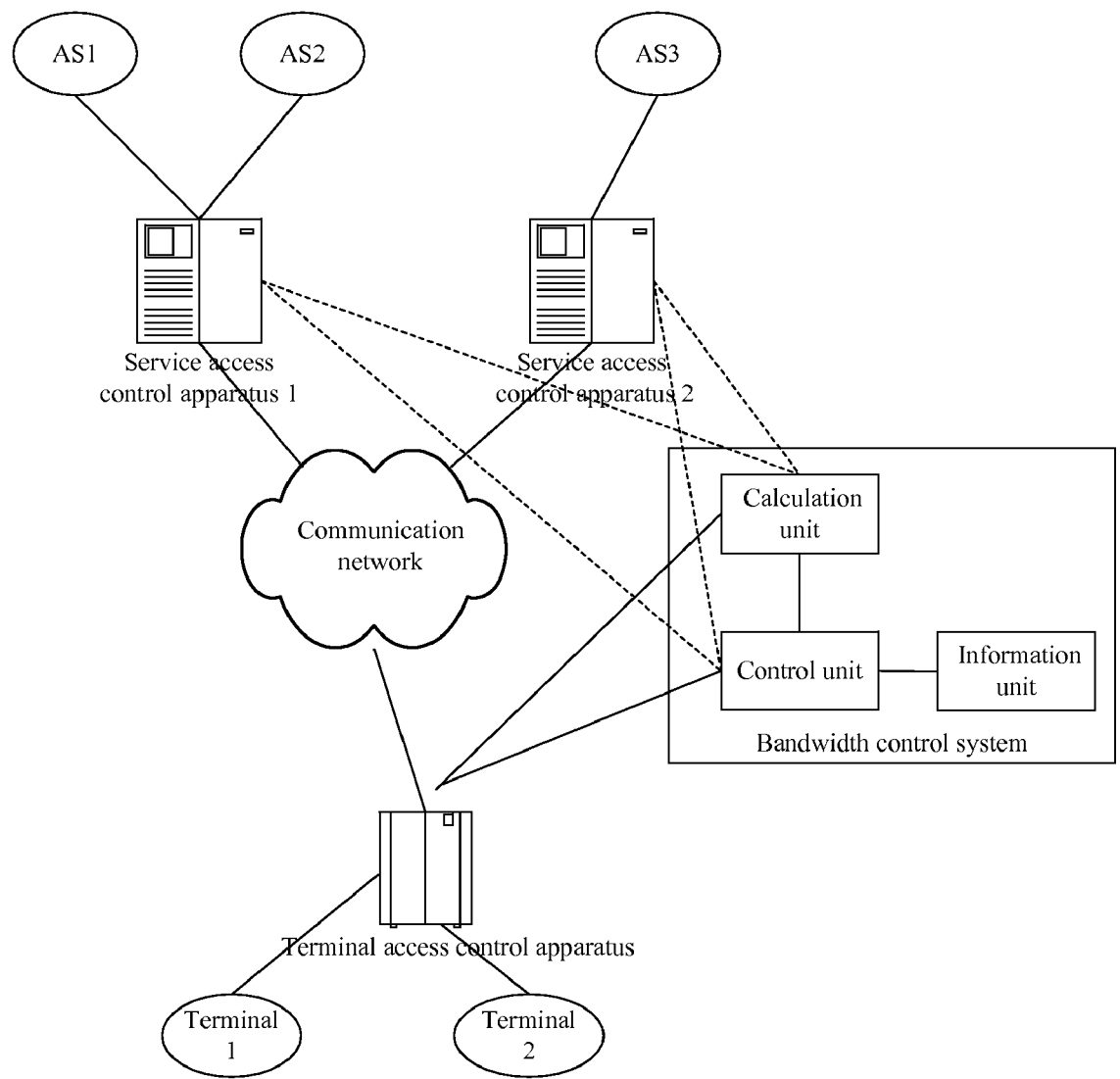
FIG. 1 is a schematic diagram illustrating a communication network in accordance with various embodiments of the present disclosure.

FIG. 1 is a schematic diagram illustrating a network for implementing bandwidth control in accordance with various embodiments of the present disclosure. As shown in FIG. 1, the entities involved in the present disclosure include: user terminals, a terminal access control apparatus, a communication network for bearing application services, service access control apparatuses for providing the communication network with application services, Application Servers (ASs) and a bandwidth control system. The user terminals, the terminal access control apparatus, the communication network, the service access control apparatuses and the ASs are existing entities in a network of the prior art while the bandwidth control system is a new entity added into the network of the prior art as described herein. The bandwidth control system includes: a calculation unit, a control unit and an information unit, and the control unit is connected to the calculation unit and the information unit. FIG. 1 is only an embodiment of the network for implementing bandwidth control and the embodiment includes only two user terminals, three ASs, two service access control apparatuses and one terminal access control apparatus. However, in practical applications, the network may include a considerable number of user terminals, ASs, service access control apparatuses and terminal access control apparatuses, which involve complicated connections among these entities. The connections between the bandwidth control system and the entities in the network are described with reference to the network shown in FIG. 1, yet the description shall not be used in limiting the number or connection patterns of the entities in the network.

The various embodiments shown in FIG. 1 include two user terminals (Terminal 1 and Terminal 2), three ASs (AS1, AS2 and AS3), two service access control apparatus (Service access control apparatus 1 and Service access control apparatus) and only one terminal access control apparatus. The communication network is connected to the terminal access control apparatus, the Service access control apparatus 1 and the Service access control apparatus 2. The Terminal 1 and the Terminal 2 are connected to the terminal access control apparatus in order to access the communication network. The ASs are connected to the Service access control apparatus in order to access the communication network; as shown in FIG. 1, the AS1 and the AS2 are connected to the Service access control apparatus 1 and the AS3 is connected to the Service access control apparatus 2. The present disclosure may be applied on the terminal access side or the service access side, i.e., the bandwidth control system in accordance with the present disclosure may be installed on the terminal access side or the service access side. If the bandwidth control system is installed on the service access side, the calculation unit in the bandwidth control system receives traffic from each of the service access control apparatuses in the network, e.g., the traffic from the Service access control apparatus 1 and the Service access control apparatus 2 in FIG. 1, and calculates the actual bandwidth occupied by each service according to the received traffic. If the bandwidth control system is installed on the terminal access side, the calculation unit in the bandwidth control system receives traffic from the terminal access control apparatus in the network and accordingly calculates the actual bandwidth occupied by each service.

Because the method provided is implemented through different processes on the terminal access side and on the service access side, and the structure of the bandwidth control system on the terminal access side is different from the structure of the bandwidth control system on the service access side, the processes and structures on the terminal access side and on the service access side are described respectively with reference to the accompanying drawings.

Figure 2:
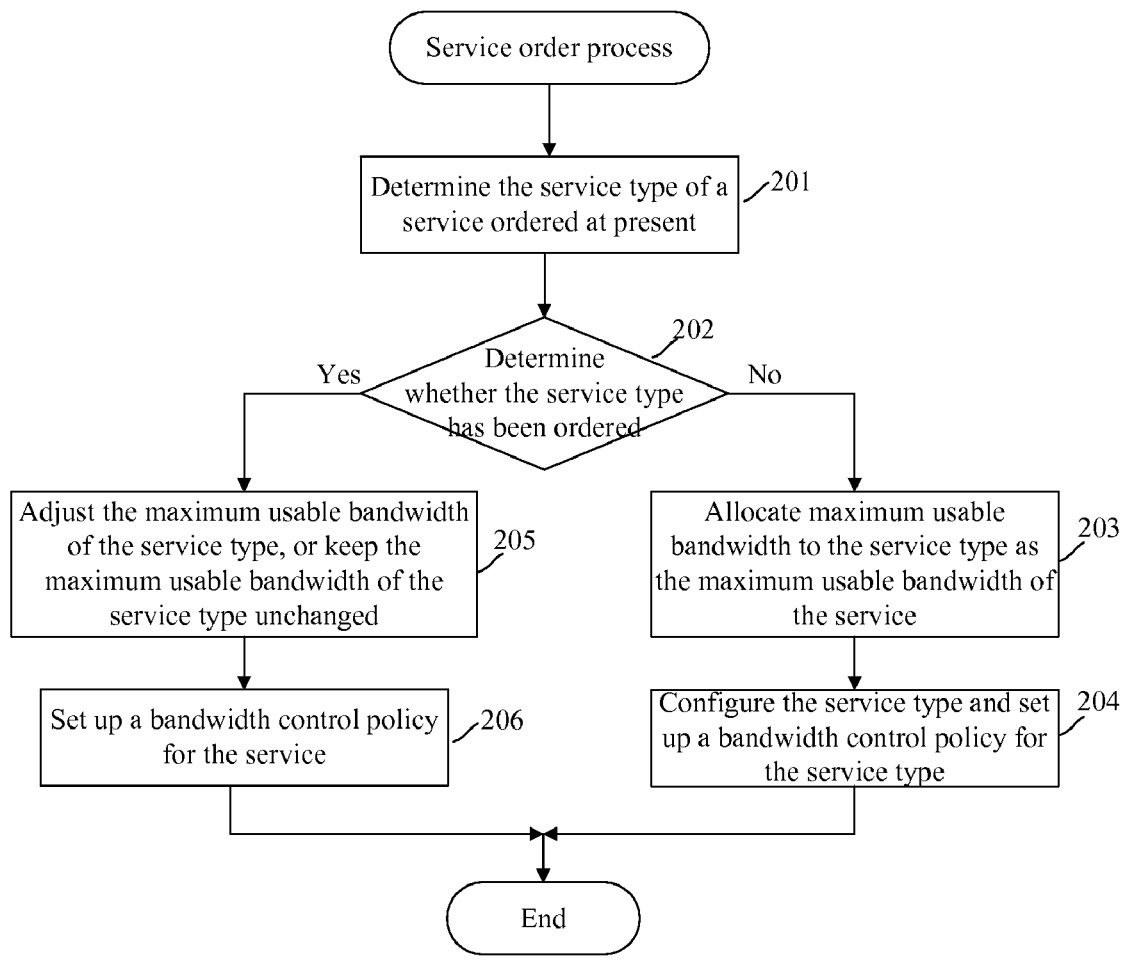
FIG. 2 is a flow chart illustrating a service order process in accordance with various embodiments of the present disclosure.

First of all, the bandwidth control system, installed on the terminal access side or on the service access side, has to set up maximum usable bandwidth and bandwidth control policies in a service order process shown in FIG. 2.

FIG. 2 is a flow chart illustrating a service order process in accordance with various embodiments. The present disclosure relates to the bandwidth control method, hence the service order process described hereafter includes only the processes related to bandwidth control, and the processes unrelated to the bandwidth control in the service order process and will not be described herein. As shown in FIG. 2, the service order process includes:

Block 201: The information unit in the bandwidth control system receives service order information of a user from an external network and determines the service type of the service ordered by the user according to the service order information. For example, if the user orders an Internet Protocol TV (IPTV) service, the service type is determined to be a streaming media service; or if the user orders a sports program, the service type of the sports program is determined to be an IPTV service. According to the demands in practical applications, some services can not fall into a service type with other services, but constitute a service type of their own, hence the service type described herein may include one or multiple services. However, the present disclosure does not limit the service type or services ordered by the user.

In a conventional communication network, a unified and detailed definition is defined for each service ordered by the user, each service has a unique service ID and belongs to a certain service type, and each service type also has a unique service type ID. The service order information may include: a user ID, a service ID, bandwidth requirements, and may further include a service type ID. The service ordered and the service type of the service ordered may be determined according to the service ID, or, the service type of the service ordered may be determined directly according to the service type ID.

Block 202: The information unit determines whether the service type being ordered at present includes a service that has already been ordered by the user, i.e., whether the service type is a new service type ordered by the user. If the service type includes a service that has already been ordered by the user, the service type is not a new service type and Block 205 is performed; if the service type includes no service that has already been ordered by the user, the service type is a new service type and Block 203 is performed.

The service type being ordered at present is the service type determined in Block 201. The information unit maintains in real time a relation table of corresponding relations between a user, services ordered by the user and the service types of the services, hence whether the user has ordered a service included in the service type may be determined by searching the relation table according to the user ID and the service type ID in the service order information.

Block 203: The information unit allocates bandwidth to the new service type and allocates whole bandwidth of the new service type to the service in the new service type. The bandwidth allocated to the new service type may be regarded as the maximum usable bandwidth of the service.

Block 204: The information unit configures the new service type and sets up a bandwidth control policy for the service, and the process terminates.

Block 205: The information unit allocates a maximum usable bandwidth to the service and adjusts the maximum usable bandwidth of the service type that includes the service, or keeps the original maximum usable bandwidth of the service type unchangeable and adjusts the maximum usable bandwidth of each service ordered by the user and included in the service type. It should be noted that the maximum usable bandwidth is not the actual bandwidth occupied by the service, and usually the actual bandwidth occupied by the service is lower than the maximum usable bandwidth allocated to the service when the user uses the service.

The allocation of the maximum usable bandwidth to the service or the service type may require interaction with the user terminal, i.e., the selection and confirmation made by the user. Obviously, if the service order information of the user carries the information on the allocation of the maximum usable bandwidth, the interaction with the user terminal is unnecessary and the maximum usable bandwidth of the service or the service type may be allocated directly according to the service order information and subscription information of the user. It should also be noted that, while determining the maximum usable bandwidth of the service or the service type, it needs to be determined first whether the maximum usable bandwidth ordered or selected by the user exceeds the bandwidth supported by the network capacity, and if the maximum usable bandwidth exceeds the bandwidth supported by the network capacity, the maximum usable bandwidth ordered or selected by the user should be refused and the user should be prompted to order or select again. For example, if the network type and terminal capacity of the user physically limit the maximum usable bandwidth of the user terminal to 2 MB, the bandwidth higher than 2 MB, which is selected by the user while ordering a service, will not be allowed and the user should be prompted to select a maximum usable bandwidth again.

Block 206: The information unit sets up the bandwidth control policy for the service.

At least a bandwidth control policy should be set up for a service type, and a bandwidth control policy may further be set up for each service included in the service type, and it should be ensured that the bandwidth control policy of each service is compatible with the bandwidth control policy of the service type. For example, the bandwidth control policy of Service type A includes: ensuring the bandwidth of each service in Service type A according to the priority level of each service, hence the bandwidth control policy of Service A' in Service type A may include: increasing bandwidth until the requirement of Service A' is met. In the embodiment shown in FIG. 2, a bandwidth control policy is set up for each service type and bandwidth control policies are setup for services in each service type. If only the bandwidth control policy of each service type is needed, it is unnecessary to set up a bandwidth control policy of the service in Block 204 and Block 206 may be omitted. In order to avoid the possible conflict between the bandwidth control policy of a service and the bandwidth control policy of the service type which includes the service, the bandwidth control policy of the service may be configured to be a sub-policy under the bandwidth control policy of the service type, therefore the bandwidth control policy of the service can only be applied according to the bandwidth control policy of the service type after the application of the bandwidth control policy of the service type. The present disclosure does not limit the bandwidth control policy contents.

The bandwidth control policy may be a group of functions or a combination of rules. The control unit adjusts bandwidth by controlling the traffic of each service according to bandwidth control policy. The following relations should be maintained in real time: the corresponding relations between a user and services ordered by the user, the corresponding relations between services and service types of the services, and the corresponding relation between the service types and the bandwidth control policies of the service types. The corresponding relations between the services in each service type and the bandwidth control policies of the services may also be maintained. Table 1 shows the relations between service types and bandwidth control policies.

TABLE 1

| Service type ID | Policy ID | Policy description |
| --- | --- | --- |
| Service type A | Policy 1 | Guarantee the bandwidth of services with higher priority levels and block the bandwidth of services with lower priority levels |
| Service type B | Policy 2 | Allocate equal bandwidth to different services |
| Service type C (Service C) | Policy 3 | Expand the bandwidth until the service requirements are met |
| ... | ... | ... |

In Table 1, Policy 1 requires, when the bandwidth of a service type exceeds the maximum usable bandwidth allocated to the service type, the bandwidth of services with higher priority levels should be guaranteed and the bandwidth of services with lower priority levels should be limited. For example, the bandwidth control policy of Service type A is Policy 1, and the total of the maximum usable bandwidth allocated to each service in Service type A is 1M; Service type A includes Service 1, Service 2 and Service 3, the priority level of Service 1 is the highest and the priority level of Service 3 is the lowest; when the total bandwidth occupied by the three services exceeds 1M, the bandwidth of Service 1 and Service 2 shall be guaranteed and the bandwidth of Service 3 shall be blocked. In addition, the bandwidth control policies may also be described with policy combinations and functions. The present disclosure does not limit the description method of bandwidth control policies and will not provide more bandwidth control policy descriptions herein.

The bandwidth control policy described above is designed for service plane in a service type and the bandwidth control may be performed for the services in the service type according to the bandwidth control policy, so as to ensure that bandwidth occupied by each service type does not exceed the bandwidth ordered for the service type. However, when actual bandwidth occupied by each service type does not exceed the bandwidth ordered for the service type while the total of the actual bandwidth occupied by the service types exceeds the bandwidth allocated to the user, the bandwidth control policies cannot adjust the bandwidth occupied by each service type. Therefore the present disclosure may further set up bandwidth control policies for the service type plane, e.g., a bandwidth control policy to guarantee the bandwidth of service types with higher priority levels and block the bandwidth of service types with lower priority levels. When the total of the actual bandwidth occupied by service types exceeds the bandwidth allocated to the user, the bandwidth of service types with higher priority levels are guaranteed first and the bandwidth of service types with lower priority levels may be blocked. The bandwidth control policies set for the service type plane should not conflict with the bandwidth control policies set for the service type plane, e.g., the bandwidth control policies set for the service plane may be configured to be sub-policies of the bandwidth control policies set for the service type plane.

Hence the bandwidth control may be performed at different levels according to the division of service types and bandwidth control policies are set up for each level in order to implement massive services oriented bandwidth control based on the levels. For example, the services ordered by the user may be divided into three levels: service types; sub-types and/or services in a service type; and services in a sub-type. In such case bandwidth control policies may be set up for the three levels respectively, and the bandwidth of service types, sub-types and/or services in a service type, or services in a sub-type are controlled respectively according to corresponding bandwidth control policies. The bandwidth control policy set up for each of the three levels may include a bandwidth control policy or a set of bandwidth control policies. Two different bandwidth control policies may also be set up for a certain level, one of the bandwidth control policies is used for controlling the bandwidth of the service types in the first level, controlling the bandwidth of sub-types and/or services in a service type in the second level, and controlling the bandwidth of services in a sub-type in the third level, e.g., the above-mentioned bandwidth control policy based on priority level, the other of the bandwidth control policies is used for controlling the bandwidth of a service type or a service, e.g., a bandwidth control policy of expanding the bandwidth until the requirements of the service is met.

A bandwidth control system described herein may effectively control the bandwidth of services ordered by a user according to the service order process and bandwidth control policies explained in the fore-going description.

Figure 3:
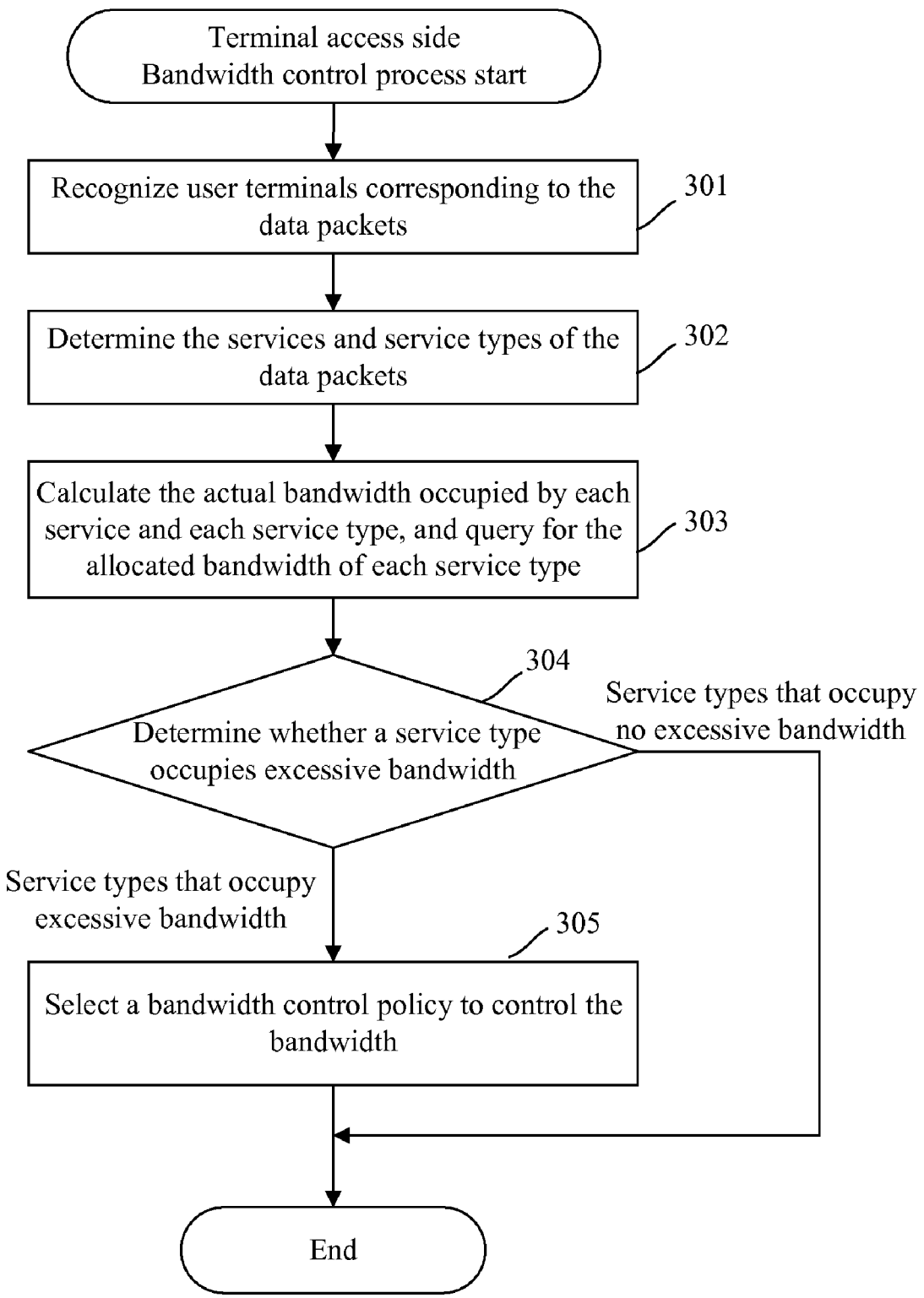
FIG. 3 is a flow chart illustrating a bandwidth control process on the terminal access side in accordance with various embodiments of the present disclosure.

FIG. 3 is a flow chart illustrating a bandwidth control process on the terminal access side in accordance with various embodiments. The bandwidth control process may be triggered regularly or by an event. The trigger mechanism may be determined according to practical demands and is not defined herein. As shown in FIG. 3, the service order process includes:

Block 301: Uplink data packets and downlink data packets of each user terminal are recognized, uplink data packets and downlink data packets corresponding to each user terminal are determined and Blocks 302 to 305 are performed for each user terminal.

The method of the disclosure may be applied to a terminal access control apparatus, and the terminal access control apparatus is able to count data packets of each user terminal easily, e.g., determine the user terminal to which each data packet belongs according to the address of the user terminal. The address of the user terminal includes information for identifying the terminal access, e.g., an IP address or a telephone number. The uplink data packets are sent from the user terminal to the network side and the downlink data packets are sent from the network side to the user terminal; the uplinks and downlinks of the network may function as symmetric transmission or asymmetric transmission, and may be applied to the uplinks and/or downlinks according to requirements for bandwidth control in practical applications.

Block 302: A service and a service type of each data packet are determined. The service of each data packet may be determined with the service category information in the data packet header, e.g., a service identification code, and the service type of each data packet may be determined according to the service of the data packet; the service and service type of each data packet may also be determined by other methods, e.g., by checking the IP quintuple attributes of the data packet. The IP quintuple includes five IP attributes of a data packet: a source IP address, a destination IP address, a source port number, a destination port number and an IP layer protocol number.

In the service order process shown in FIG. 2, the bandwidth control system keeps the corresponding relations between different services and service types of the services, therefore the service types of the services may be determined once the services of the data packets are determined. Table 2 shows the corresponding relations between services, service types and service identification codes.

TABLE 2

| Service ID | Service type ID | Service ID code |
|---|---|---|
| Service 1 | Service type A | 10111001 |
| Service 2 | Service type B | 10110101 |
| Service 3 | Service type C | 10111101 |
| ... | ... | ... |

According to Table 2, when the service identification code of a data packet is "10110101", it may be determined that the data packet is transmitted for Service 2 in Service type B.

Block 303: The traffic of each service of the user terminal in unit time is counted; the traffic equals the actual bandwidth occupied by the each service of the user terminal, and the bandwidth occupied by each service type may further be calculated according to the bandwidth of each service, and then the maximum usable bandwidth allocated to each service type of the present user is queried.

Multiple calculation methods may be used and are not limited to the calculation methods described herein. For example, the bandwidth occupied by different services may be calculated first (as shown in Table 3 below) and the bandwidth of the service types are calculated accordingly.

TABLE 3

| Service ID | Service type ID | Occupied bandwidth |
|---|---|---|
| Service 1 | Service type A | 450 KB |
| Service 2 | Service type A | 110 KB |
| Service 3 | Service type B | 120 KB |
| ... | ... | ... |

As shown in Table 3, the bandwidth occupied by Service 1 is 450 KB and the bandwidth occupied by Service 2 is 110 KB, both Service 1 and Service 2 are included in Service type A, therefore the bandwidth occupied by Service type A is 560 KB.

Block 304: It is determined whether the actual bandwidth occupied by a service type is higher than the allocated maximum usable bandwidth, i.e., whether the bandwidth of a service type has exceeds the allocated maximum usable bandwidth, and Block 305 is performed with the service type that has occupied excessive bandwidth; and the process terminates when the service type does not occupy excessive bandwidth.

Block 305: The bandwidth control policies corresponding to the service type are determined, an appropriate bandwidth control policy is selected, and the bandwidth occupied by the service type is controlled according to the selected bandwidth control policy.

The process of controlling the bandwidth according to the bandwidth control policy is not described herein, but is available in the prior art; therefore, no further description will be given herein.

Figure 4:
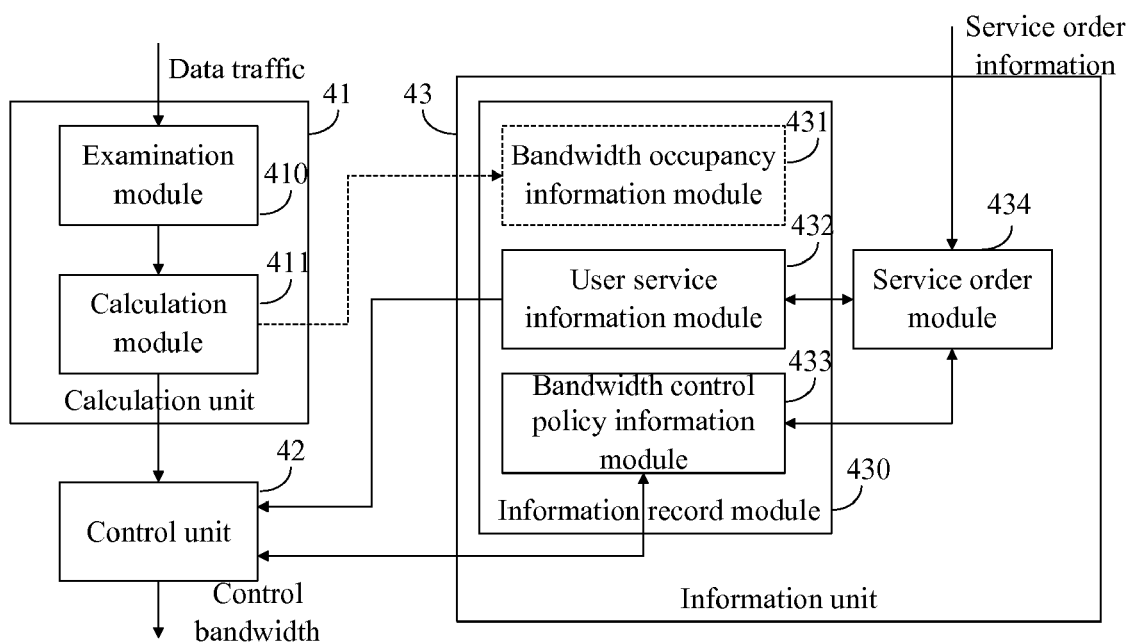
FIG. 4 is a schematic diagram illustrating a system structure on the terminal access side in accordance with various embodiments of the present disclosure.

FIG. 4 is a schematic diagram illustrating a system structure on the terminal access side in accordance with various embodiments. The various embodiments include a calculation unit 41, a control unit 42 and an information unit 43. The system in the various embodiments may be a separate entity or be integrated into a terminal access control apparatus on the terminal access side. The terminal access control apparatus usually is an access gateway based on multiple access patterns, e.g., the terminal access control apparatus is a Network Access Server (NAS). Popular NASs include dial-up access servers for dial-up access, such as a Broadband Access Server (BAS) for Asymmetric Digital Subscriber Line (ADSL) access and Local Area Network (LAN) access, a Gateway GPRS Support Node (GGSN) and a Service GPRS Support Node (SGSN) for General Packet Radio Service (GPRS) access, etc. The information unit 43 may be a separate entity or be integrated into a user profile management apparatus. The user profile management apparatus may be a Home Location Register (HLR), a Home Subscriber Server (HSS), a Customer Relationship Management (CRM) server, or a Generic User Profile (GUP) server.

The calculation unit 41 is capable of receiving data traffic of a user terminal from the terminal access control apparatus, calculating the actual bandwidth occupied by each service and the service type of the service for the user terminal by parsing the received data traffic, and exporting a result of the calculation to the control unit 42. A service order module 434 is capable of receiving service order information of a user, determining the services and service types ordered by the user according to the service order information, determining bandwidth control policies corresponding to the services and the service types, allocating maximum usable bandwidth to the services ordered by the user, and exporting the services and the service types ordered by the user and the allocated maximum usable bandwidth to an information record module 430 as service information of the user as well as exporting the determined bandwidth control policies to the information record module 430. The control unit 42 is capable of receiving the bandwidth occupied at present by each services and the service types of the user from the calculation unit 41, receiving the service information of the user from the information record module 430, and if a service or a service type occupies excessive bandwidth at present, reading the bandwidth control policy corresponding to the service or the service type that occupies excessive bandwidth from the information record module 430, and adjusting the bandwidth of the service or the service type according to the bandwidth control policy. The bandwidth control is thus achieved.

As shown in FIG. 4, the calculation unit 41 may include an examination module 410 and a calculation module 411, and the information record module 430 may include a user service information module 432 and a bandwidth control policy information module 433. The examination module 410 is used for parsing the data traffic to the user terminals, determining the user terminal to which each data packet in the data traffic belongs, service and service type of each data packet and exporting the information on the user terminal, service and service type of each data packet to the calculation module 411 as the data packet information. The calculation module 411 is used for calculating the traffic of each service according to the data packet information from the examination module 410 and obtaining the traffic of each service in unit time, i.e., the actual bandwidth occupied by the service at present, and further obtaining the actual bandwidth occupied by each service type at present, and exporting the actual bandwidth occupied by each service and each service type respectively at present and calculated by the calculation module 411 to the control unit 42. The user service information module 432 is used for receiving user service information from the service order module 434 and exporting the user service information to the control unit 42. The bandwidth control policy information module 433 is used for storing the bandwidth control policies corresponding to services ordered by a user and the service types of the services and exporting the bandwidth control policies to the control unit 42.

In addition, according to the demands of practical applications, the network may charge a user terminal according to the actual bandwidth occupied by the services which are enjoyed by user terminal, therefore an entity for charging in the network usually needs to query the bandwidth occupancy information of the information unit 43. In such case the information record module 430 may further include a bandwidth occupancy information module 431 for recording the bandwidth occupied by each service and each service type for a user terminal, and the calculation module 411 may further export the bandwidth occupied by each service and each service type for the user terminal to the bandwidth occupancy information module 431.

FIG. 4 shows a bandwidth control system for only one user terminal, and the bandwidth control system includes a calculation unit 41, a control unit 42 and an information unit 43. When the system is applied to a communication network which includes a great number of user terminals, the calculation unit 41 may be used for calculating the data traffic of one or multiple user terminals, the control unit 42 may be used for controlling the bandwidth of one or multiple user terminals and the information unit 43 may be connected to one or multiple control units or calculation units. The applications will not be shown repeatedly in the accompanying drawings, yet the working procedures of the calculation unit 41, control unit 42 and information unit 43 are always the same as described above in any of the applications, therefore the working process of the system in different practical applications will not be described repeatedly herein, but is still covered by the protection scope of the present disclosure.

Figure 5:
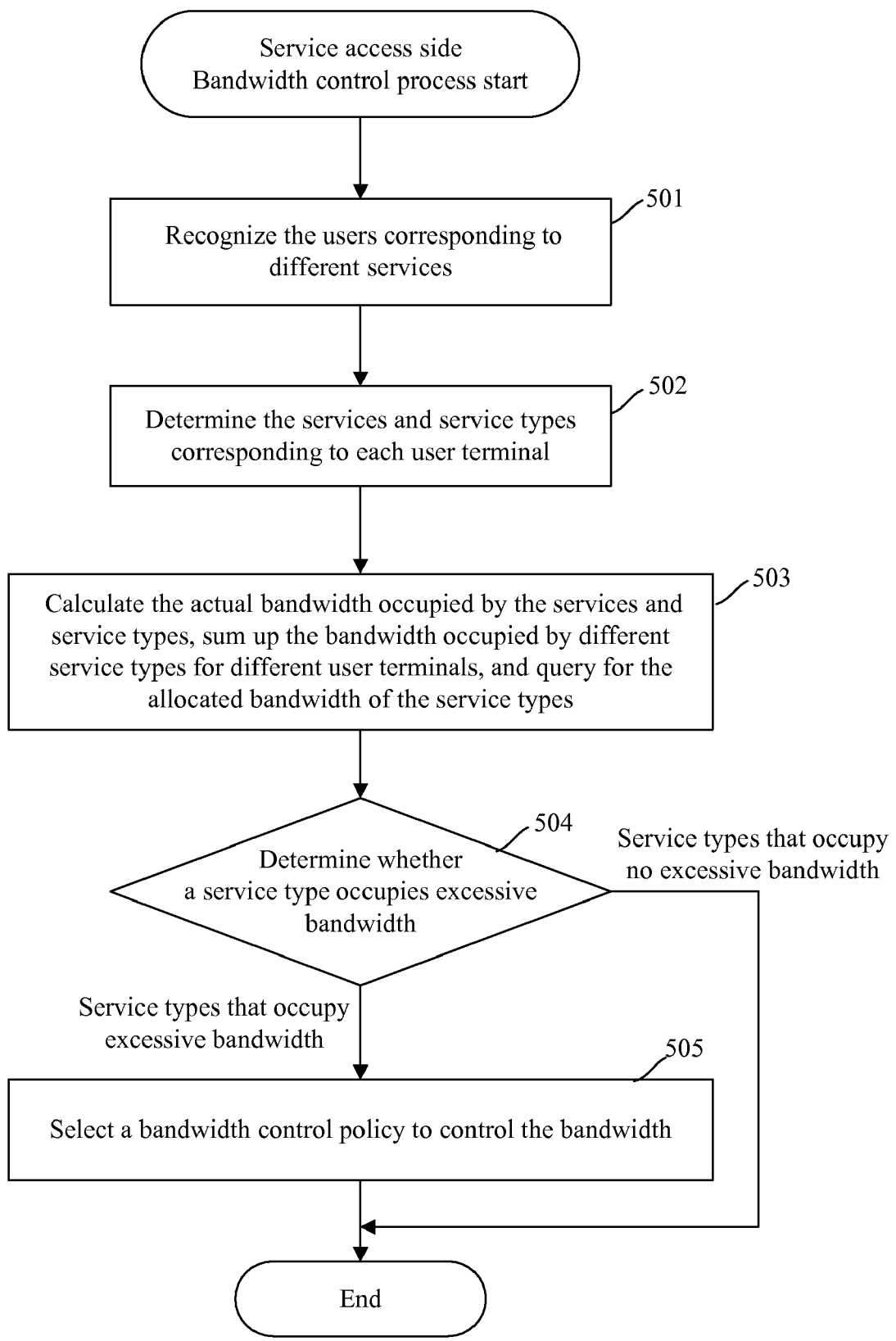
FIG. 5 is a flow chart illustrating a bandwidth control process on the service access side in accordance with various embodiments of the present disclosure.

FIG. 5 is a flow chart illustrating a bandwidth control process on the service access side in accordance with various embodiments As shown in FIG. 5, the service order process includes:

Block 501: A user terminal corresponding to each service is determined.

On the service access side, the bandwidth control system has to parse data packets from all ASs, each of the ASs may provide one or multiple services, the bandwidth control system determines the user terminals and services corresponding to the data packets according to routing information and address information in the data packets.

Block 502: The services and the service types enjoyed by the user terminals determined in Block 501 are determined, and Blocks 503 to 505 may be performed with each of the user terminals.

The services enjoyed by each user terminal may be learnt from the process in Block 501, and the service types of the services enjoyed by the user terminal may further be determined according to the corresponding relations between services and service types. Herein, the corresponding relations are obtained in the service order process.

Block 503: The actual bandwidth occupied by each service at present is calculated, and the bandwidth occupied by each service type at present is further calculated; and the maximum usable bandwidth allocated to each service type in the service order process is queried.

Multiple calculation units may be installed on the service access side in multiple service access control apparatuses, each of the service access control apparatuses is connected to one or multiple ASs, hence a calculation unit makes the calculation according to the data packets on the AS connected to the service access control apparatus which includes the calculation unit. However, a service terminal may use services provided by multiple ASs which may connect with multiple calculation units, therefore the bandwidth obtained by one calculation unit for service types enjoyed by the user terminal does not equal the actual overall bandwidth occupied by all service types at present for the user terminal, the bandwidth of the user terminal calculated by all calculation units should be summed up to obtain the actual overall bandwidth occupied by all service types at present for the user terminal. The information unit is used for recording the user service information and bandwidth control policy information in a centralized manner, one information unit may be connected to multiple calculation units, therefore all the bandwidth occupied by service types for the user terminal, which are calculated by different calculation units, may be reported to the information unit which sums up the bandwidth.

Block 504: It is determined whether the actual bandwidth occupied by a service type is higher than the allocated maximum usable bandwidth, i.e., whether the bandwidth of a service type has exceed the allocated maximum usable bandwidth, and Block 505 is performed with the service type that has occupied excessive bandwidth; and the process terminates when the service type does not occupy excessive bandwidth.

Block 505: The bandwidth control policies corresponding to the service type are determined, an appropriate bandwidth control policy is selected and the bandwidth occupied by the service type is controlled according to the selected bandwidth control policy.

The system shown in FIG. 4 may be applied when the system is applied on the service access side. The calculation unit 41 is used for receiving data traffic of the ASs from the service access control apparatus, parsing the data traffic to determine user terminals, services and service types corresponding to different data packets, calculating the actual bandwidth occupied by different services and service types for a user terminal, and exporting the actual occupied bandwidth to the control unit 42. The service order module 434 is used for receiving service order information of a user, determining the services and service types ordered by the user according to the service order information, determining the bandwidth control policies corresponding to the services and the service types, allocating maximum usable bandwidth to the services ordered by the user, and exporting the services and the service types ordered by the user and the allocated maximum usable bandwidth as the service information of the user to the information record module 430 as well as exporting the determined bandwidth control policies to the information record module 430. The control unit 42 is used for receiving from the calculation unit 41 the actual bandwidth occupied by the services and service types for the user terminal, receiving from the information record module 430 the user service information corresponding to the services and service types enjoyed by the user terminal at present, and reading, if a service or a service type is determined to have occupied excessive bandwidth, the bandwidth control policy corresponding to the service or the service type from the information record module 430, and adjusting the excessive bandwidth occupied by the service or the service type according to the bandwidth control policy. Therefore the bandwidth control is achieved. A condition for the normal operation of a system in such structure is that the ASs which provide services for one user terminal have to be connected to one calculation unit 41.

Figure 6:
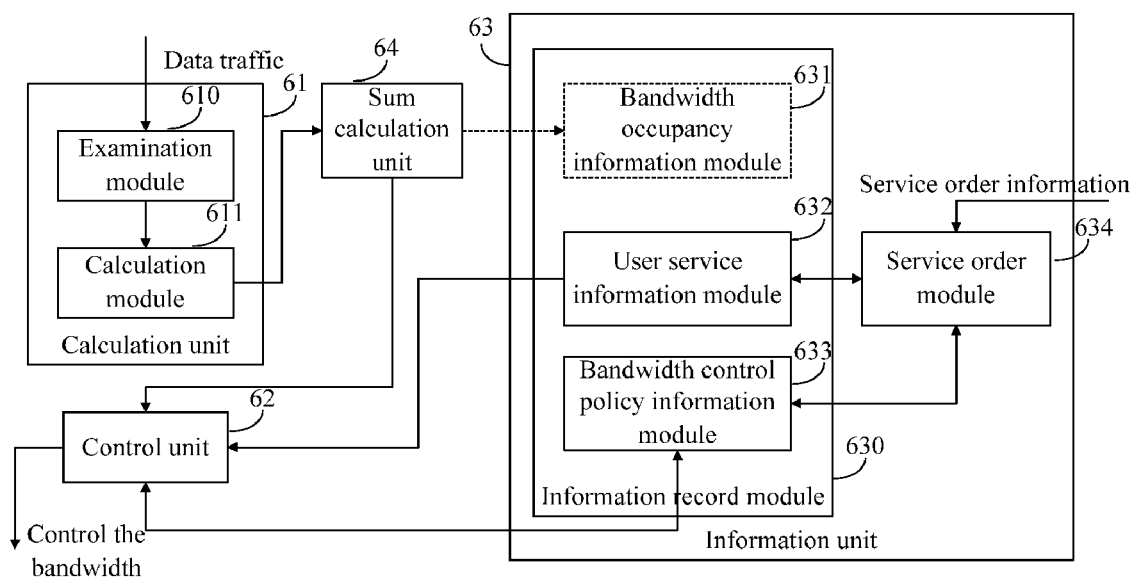
FIG. 6 is a schematic diagram illustrating a system structure on the service access side in accordance with various embodiments of the present disclosure.

Obviously, the ASs which provide services for one user terminal are possibly connected to different calculation units in practical applications, hence the bandwidth control system shown in FIG. 6 should be applied.

FIG. 6 is a schematic diagram illustrating a system structure on the service access side in accordance with various embodiments. The embodiment includes a calculation unit 61, a control unit 62, an information unit 63 and a sum calculation unit 64. The calculation unit 61 includes an examination module 610 and a calculation module 611; the information unit 63 includes an information record module 630 and a service order module 634. The information record module 630 includes a user service information module 632 and a bandwidth control policy module 633. The system includes multiple calculation units which are all connected to the sum calculation unit 64. Because the functions and structures of the calculation units are all identical, FIG. 6 shows only one calculation unit 61. The system may be a separate entity or be integrated into a service access control apparatus on the service access side. The service access control apparatus usually is a Data Service Management Platform (DSMP) in a mobile network. The information unit 63 may be a separate entity or be integrated into a user profile management apparatus. The user profile management apparatus may be an HLR, or an HSS, or a CRM server, or a GUP server, etc.

The examination module 610 is used for receiving data traffic of the ASs from the service access control apparatus, parsing the data traffic to determine user terminals, services and service types corresponding to different data packets, and exporting the user terminals, services and service types corresponding to different data packets as the data packet information to the calculation module 611. The calculation module 611 is used for calculating the actual bandwidth occupied by different services and service types for the user terminal according to the received data packet information, and exporting the actual occupied bandwidth to the sum calculation unit 64. The service order module 634 is used for receiving service order information of the user, determining the services and service types ordered by the user according to the service order information, determining the bandwidth control policies corresponding to the services and the service types, allocating maximum usable bandwidth to the services ordered by the user, and exporting the services and the service types ordered by the user and the allocated maximum usable bandwidth as the service information of the user to the user service information module 632 as well as exporting the determined bandwidth control policies to the bandwidth control policy information module 633. The user service information module 632 is used for receiving the user service information from the service order module 634, and exporting the user service information to the control unit 62. The bandwidth control policy information module 633 is used for recording the bandwidth control policies corresponding to different services and service types for the user and exporting the bandwidth control policies to the control unit 62. The sum calculation unit 64 is used for receiving from all calculation units the actual bandwidth calculated by the calculation units for the service types enjoyed by the user at present, summing up the total of the actual bandwidth occupied by the service types enjoyed by the user at present, and exporting the total bandwidth to the control unit 62. The control unit 62 is used for receiving from the sum calculation unit 64 the actual bandwidth occupied by the services and service types of the user terminal, receiving from the user service information module 632 the user service information of the user terminal at present, and reading, if a service or a service type is determined to have occupied excessive bandwidth, the bandwidth control policy corresponding to the service or the service type from the bandwidth control policy information module 633, and adjusting the bandwidth occupied by the service or the service type according to the bandwidth control policy.

Therefore the bandwidth control is achieved. The sum calculation unit 64 may be separated from other units in the system, yet the sum calculation unit 64 may also be integrated into the information unit 63 if such case that the information unit 63 records the user service information and bandwidth control policies of user terminals in a centralized manner is considered.

In addition, according to the demands of practical applications, the network may charge a user terminal according to the actual bandwidth occupied by the services which are enjoyed by the user terminal, therefore an entity for charging in the network usually needs to query the bandwidth occupancy information of the information unit 63. In such case the information record module 630 may further include a bandwidth occupancy information module 631 for recording the bandwidth occupied by the services and service types for different user terminals, and the sum calculation unit 64 may further export the bandwidth occupied by the services and service types for different user terminals to the bandwidth occupancy information module 631.

FIG. 6 shows a bandwidth control system for only one user terminal, and the bandwidth control system includes: one or multiple calculation units connected to the user terminal, a sum calculation unit 64 connected to the one or multiple calculation units, a control unit 62 and an information unit 63. When the system is applied to a communication network that includes a large number of user terminals and ASs, the calculation unit 61 may be used for calculating the data traffic of one or multiple ASs, the control unit 62 may be used for controlling the service bandwidth of one or multiple ASs, the sum calculation unit 64 may be connected to one or multiple control units, and the information unit 63 may be connected to one or multiple control units or sum calculation units. The applications will not be illustrated in accompanying drawings, however, the working procedures of the calculation unit 61, the sum calculation unit 64, the control unit 62 and information unit 63 in all kinds of applications are always the same as illustrated in FIG. 6; the working processes of the system in different applications will not be described repeatedly herein, but are still covered by the protection scope of the present disclosure.

It should be noted that, though the structure of the system described herein is designed for one user terminal only, the system for one user terminal may be extended directly to serve as a bandwidth control system for multiple user terminals. The multiple bandwidth control systems, each of which serves one user terminal, have identical functions and are separated from each other logically, yet the bandwidth control systems of multiple user terminals may be physically integrated into one entity, and the calculation units, and/or control units and/or information units of different user terminals may also be integrated into one entity. The deployment of and the connections among bandwidth control systems in accordance with the present disclosure for multiple user terminals are influenced by multiple factors including the number of user terminals and the demands of the applications, therefore the combinations and connections of the system deployments will be unexhausted in practical applications. So the bandwidth control system for multiple user terminals will not be described herein, but is still covered by the protection scope of the present disclosure.

Figure 7:
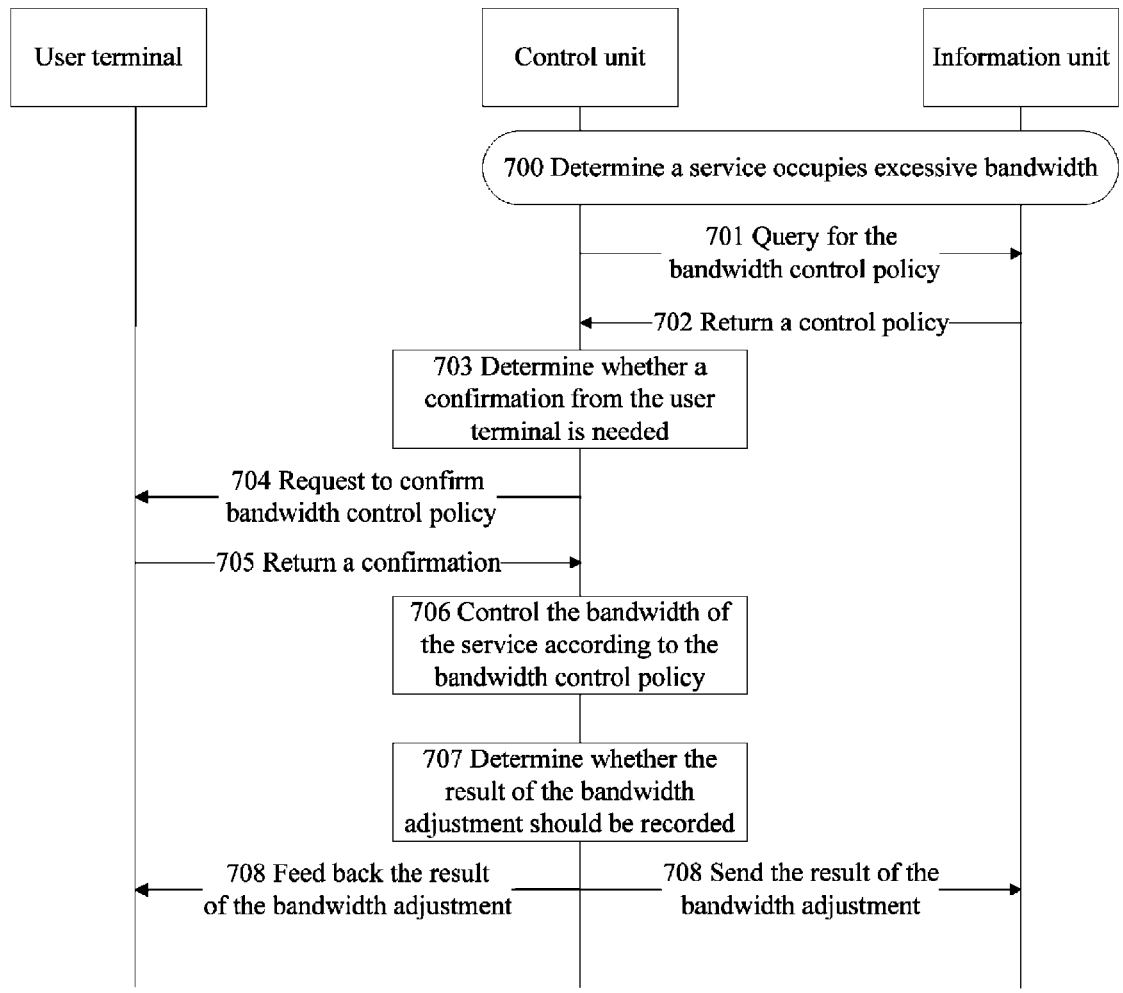
FIG. 7 is a flowchart illustrating a signaling interaction process in accordance with various embodiments of the present disclosure.

FIG. 7 is a flowchart illustrating a signaling interaction process in accordance with various embodiments. The entities involved in the embodiment include a user terminal, a control unit and an information unit. As shown in FIG. 7, the process includes the following.

Block 700: The control unit determines whether a service or a service type has occupied excessive bandwidth according to the user service information from the information unit and the actual bandwidth occupied by the services and service types for the present user from the calculation unit or the sum calculation unit.

Block 701-702: The control unit queries the information unit of the bandwidth control policy corresponding to the service or service type which is determined to have occupied excessive bandwidth in 700, and the information unit returns the bandwidth control policy to the control unit.

Block 703: The control unit determine whether interaction with the user terminal is needed for confirming the bandwidth control policy, and if the interaction is needed, 704 is performed; otherwise, 706 is performed.

Block 704-705: The control unit sends a message to the user terminal, requesting the user terminal to confirm the bandwidth control policy, the message may indicate the service or the service type whose bandwidth will be adjusted, the bandwidth control policies that may be used in the adjustment, the possible result of the adjustment, and the charging information that may be involved; the user terminal returns a confirm message to the control unit to inform the control unit of the bandwidth control policy that shall be used for controlling the bandwidth.

Block 706: The control unit adjusts the bandwidth of the service or the service type that has occupied excessive bandwidth for the present user terminal according to the bandwidth control policy.

Block 707: The control unit determines whether the result of the bandwidth adjustment needs to be recorded; if the result needs to be recorded, 708 is performed; otherwise, the process is terminated.

When the result of the bandwidth adjustment involves charging or other transactions, the result of the bandwidth adjustment should be recorded by sending the result of the adjustment to the information unit by the control unit, or by caching the result of the adjustment in the local machine of the control unit and sending the result of the adjustment to the information unit. The result of the bandwidth adjustment may also be fed back to the user terminal while being sending to the information unit.

Block 708: The control unit sends the result information of the present bandwidth adjustment to the user terminal and the information unit. The result information may include a user ID, the ID of the service and/or service type whose bandwidth has been adjusted, the applied bandwidth control policy and the bandwidth after the adjustment.

To sum up, the method, system and apparatuses provided by the present disclosure control the service bandwidth of a user terminals according to service types, therefore the service bandwidth ordered by the users may be utilized effectively according to the features of different service types and the quality of services is ensured; the basic theory of the present disclosure further level-based enables bandwidth control on large number of services enjoyed by users. The present disclosure properly controls the bandwidth resources of service networks of different sizes and improves the resource utilization ratio of the whole service networks while satisfying the service demands of users, hence the present disclosure is of high commercial value to operators and service providers.

The foregoing descriptions are only preferred embodiments of the present disclosure and are not for use in limiting the protection scope thereof. Any modification, equivalent replacement or improvement made under the spirit and principles of the present disclosure is included in the protection scope of the claims of the present disclosure.

What is claimed is:

1. A bandwidth control method, comprising:
   determining, by a bandwidth control system, a plurality of services ordered by a user, wherein a service type includes multiple services;
   if the user had ordered the service type before, adjusting, by the bandwidth control system, the maximum usable bandwidth allocated to the service type, or keeping the maximum usable bandwidth allocated to the service type unchanged;
   if the user had not ordered the service type before, allocating, by the bandwidth control system, maximum usable bandwidth to the service type;
   setting up, by the bandwidth control system, a bandwidth control policy for the service type;
   calculating, by the bandwidth control system, bandwidth occupied by the service type when the user uses the service; and
   adjusting, by the bandwidth control system, according to the bandwidth control policy, the bandwidth occupied by the service type if the bandwidth occupied by the service type is higher than the maximum usable bandwidth allocated to the service type, wherein the calculating bandwidth occupied by the service type comprises:
   receiving data traffic of an Application Servers, AS, on a service access side, parsing data packets in the data traffic, determining the user and the service type of the data packet, and counting data packets corresponding to the service type in data traffic of the AS; calculating the number of data packet corresponding to the service type in the data traffic of the AS by adding up the data packets corresponding to the service type in data traffic of the AS, and calculating the bandwidth occupied by the service type according to the number of data packets corresponding to the service type.

2. The method of claim 1, further comprising:
   determining the bandwidth control policy by interacting with the user before adjusting the bandwidth occupied by the service type.

3. The method of claim 1, wherein the calculating bandwidth occupied by the service type when the user uses the service comprises:
   receiving data traffic of a user terminal on a terminal access side, parsing data packet in the data traffic, determining the users and service type of the data packets; calculating the bandwidth occupied by the service type by calculating the data packets corresponding to the service type.

4. The method of claim 1, wherein the adjusting the bandwidth occupied by the service type comprises:
   decreasing the bandwidth occupied by the service type.

5. The method of claim 1, further comprising:
   allocating maximum usable bandwidth to the service in the service type and setting up a bandwidth control policy for the service, wherein the bandwidth control policy for the service is compatible with the bandwidth control policy for the service type.

6. A system for bandwidth control, comprising:
   a calculation unit, adapted to calculate bandwidth occupied by a service type, wherein the service type includes multiple services;
   an information unit, adapted to record service ordered by a user and the service type of the service and a bandwidth control policy and maximum usable bandwidth for the service type; and
   a control unit, adapted to determine the service type which occupies bandwidth higher than maximum usable bandwidth of the service type according to the bandwidth occupied by the service type from the calculation unit and the maximum usable bandwidth of the service type from the information unit, query the information unit for the bandwidth control policy of the service type, and adjust the bandwidth occupied by the service type according to the bandwidth control policy,
   wherein the information unit comprises:
   a service order module, adapted to receive service order information from the user, determine which service is ordered by the user and what service type of the service is, determine the maximum usable bandwidth and the bandwidth control policy for the service type; and
   an information record module, adapted to record the maximum usable bandwidth and the bandwidth control policy determined by the service order module for the service type.

7. The system of claim 6, wherein the information record module comprises:
   a user service information module, adapted to record the maximum usable bandwidth determined by the service order module for the service type; and
   a bandwidth control policy information module, adapted to record the bandwidth control policy determined by the service order module for the service type.

8. The system of claim 7, wherein the information record module further comprises:
   a bandwidth occupancy information module, adapted to record the bandwidth occupied by the service type and obtained from the calculation unit.

9. A system for bandwidth control, comprising:
   a calculation unit, adapted to calculate bandwidth occupied by a service type, wherein the service type includes multiple services;
   an information unit, adapted to record service ordered by a user and the service type of the service and a bandwidth control policy and maximum usable bandwidth for the service type; and
   a control unit, adapted to determine the service type which occupies bandwidth higher than maximum usable bandwidth of the service type according to the bandwidth occupied by the service type from the calculation unit and the maximum usable bandwidth of the service type from the information unit, query the information unit for the bandwidth control policy of the service type, and adjust the bandwidth occupied by the service type according to the bandwidth control policy, further comprising:
   at least one other calculation unit;
   a sum calculation unit, adapted to calculate a sum of bandwidth occupied by the service type for different users according to the bandwidth occupied by the service type for different users from each calculation unit, and export the sum to the control unit.

* * * * *